Patented May 20, 1947

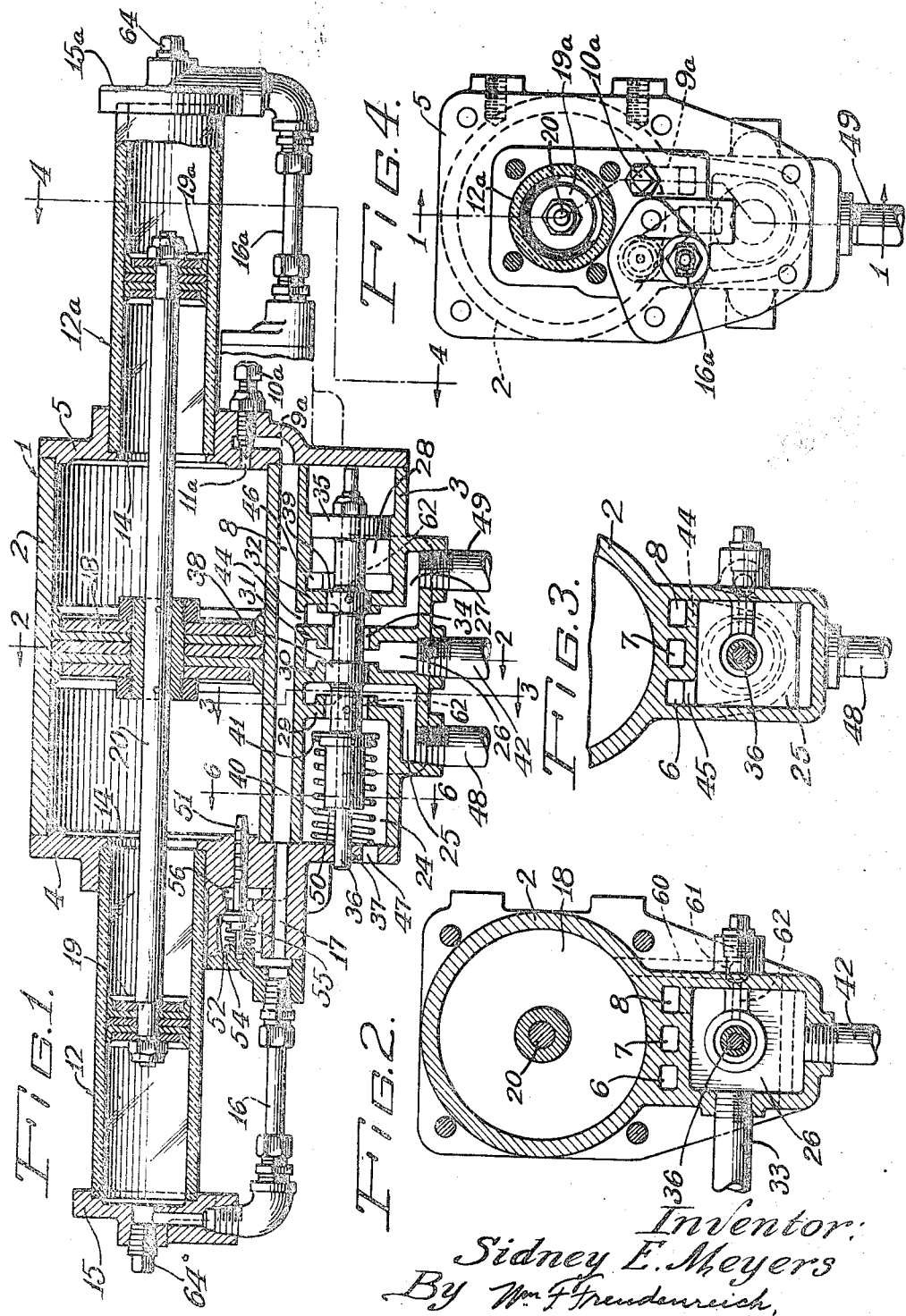

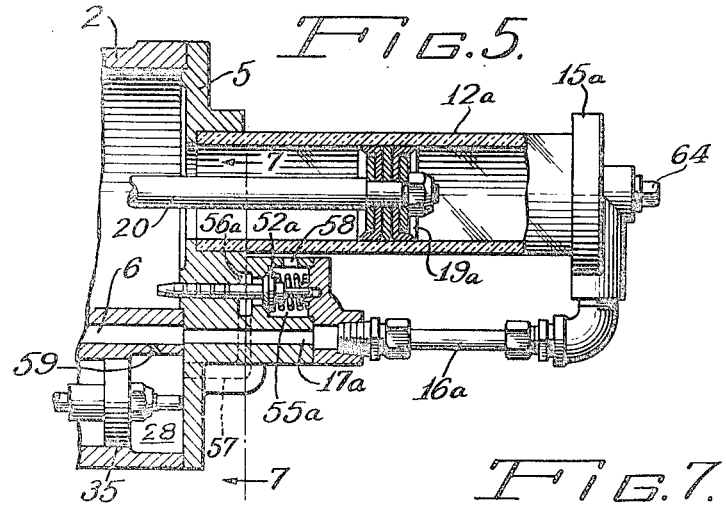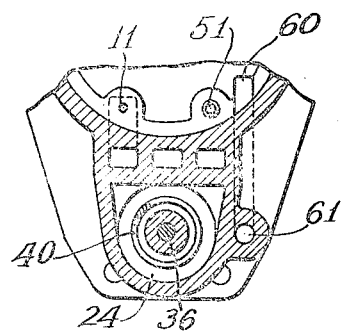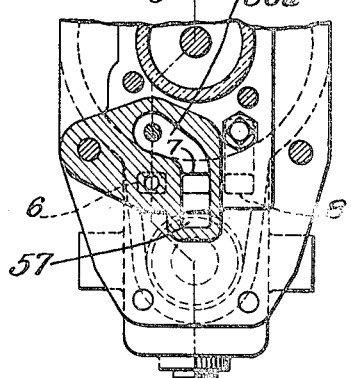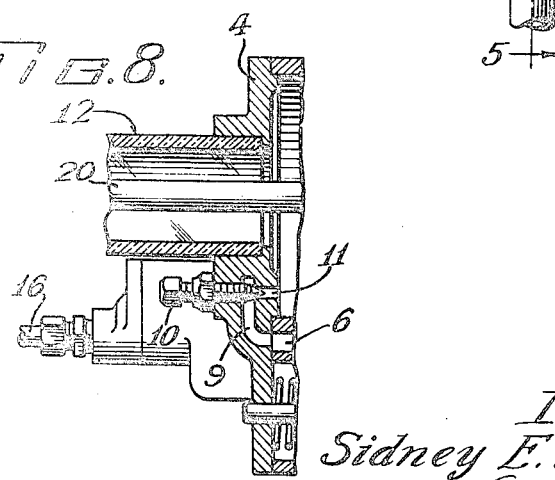

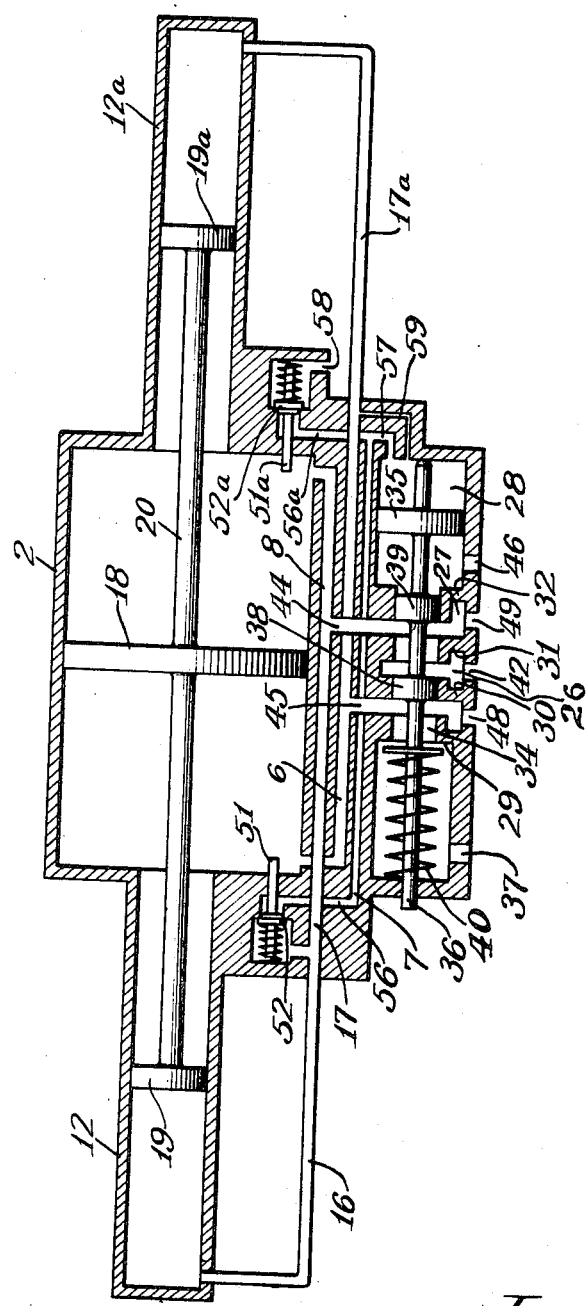

2,420,896

UNITED STATES PATENT OFFICE 2,420,896

RECIPROCATING EXPANSIBLE CHAMBER MOTOR WITH PILOT CONTROLLED DISTRIBUTING VALVE

Sidney E. Meyers, New York, N. Y., assignor to Vulcan Soot Blower Corporation, a corporation of Pennsylvania Application October 4, 1945, Serial No. 620,207

7 Claims. (Cl. 121—157)

1

The present invention relates to pneumatically energized timing devices to shift a controlling element continuously back and forth between two working positions, and has for its object to produce a device that is very simple, durable and efficient.

Heretofore it has been usual practice to provide a pilot valve, held closed by air pressure, to cause the device to remain in one of its positions, thus making the successful use of the device dependent on the existence at all times of a supply of air under pressure. The pilot valve also causes waste of air due to constant "bleed off" of air; and, viewed in one of its aspects, the present invention may be said to have for its object to eliminate this type of pilot valve and, consequently, the disadvantages resulting from its use.

Timing devices of the kind here under discussion must be flexible, so that the controlling element may remain in either working position any desired predetermined period of time which may vary widely for either position, regardless of the timing in the other; and, viewed in another of its apsects, the present invention may be said to have for its object to produce a simple and novel pneumatic timing device to provide this wide range of adjustment and permit adjustments to be made quickly and easily.

The various features of novelty whereby the present invention is characterized will hereinafter be pointed out with particularity in the appended claims; but, for a full understanding of the invention and of its objects and advantages, reference may be had to the following detailed description taken in connection with the accompanying drawings, wherein:

Figure 1 is mainly a longitudinal section through a device embodying the present invention on irregular broken line 1—1 of Fig. 4; Figs. 2, 3 and 4 are sections on lines 2—2, 3—3 and 4—4, of Fig. 1, respectively, Fig. 3 being only fragmentary; Fig. 5 is a view more or less similar to Fig. 1, showing only a fragment of the device, and the section being taken on a line similar to line 1—1 of Fig. 4, except that it is deflected toward the left instead of to the right to correspond with line 5—5 in Fig. 7; Fig. 6 is a section on line 6—6 of Fig. 1; Fig. 7 is a section on line 7—7 of Fig. 5; Fig. 8 is a longitudinal section showing a fragment of the opposite end of the device from that appearing in Fig. 5, and on the same plane as the latter; and Fig. 9 is a schematic or diagrammatic view illustrative of the device.

2

Referring to Figs. 1-8 of the drawings, 1 represents a casting comprising a long cylindrical shell 2 that constitutes the main cylinder of the device and a casing 3 for a reversing valve. The cylinder and casing are open at both ends. There is a single head at each end of the casting, serving to close the corresponding ends of both the cylinder and the valve casing; the two heads, 4 and 5, being alike except for one small detail to which reference will hereinafter be made. In the wall between the cylinder and valve casing are three independent passages, 6, 7 and 8 extending from one end of the casting to the other and having their ends closed by said heads.

The central passage 7 is used to control the reversing valve, passages 6 and 8 to admit air to and exhaust it from the left and right hand ends, respectively, of the cylinder as it appears in Fig. 1. Passage 6 communicates at one end, as shown in Fig. 8, with a passage 9 in head 4. A needle valve 10 controls a port 11 leading from passage 9 into the left hand end of the main cylinder. At the opposite end of the device, as best shown in Fig. 1, passage 8 communicates with a passage 9a in head 5, and there is a needle valve 10a controlling a port 11a leading from this latter passage into the right hand end of the cylinder.

Each main cylinder head has an auxiliary cylinder, coaxial with the main cylinder, projecting outwardly therefrom. In the arrangement shown, each auxiliary cylinder comprises a glass tube, indicated at 12 and 12a, respectively, separably engaged with the head in registration with an opening 14 through the head; together with a head, 15 and 15a, respectively, closing the outer end of the tube. Each of these heads may be held in place by the pipe connection, indicated at 16 and 16a, respectively, between the same and the corresponding main cylinder head. As best shown in Fig. 5, the right hand end of passage 6 registers with a passage 17a in head 5, which passage, in turn, communicates with pipe 16a. Likewise, as shown in Fig. 1, passage 8 registers with a passage 17 that communicates with pipe 16.

In the main cylinder is a piston 18, while in the small cylinders are pistons 19 and 19a, respectively; all these pistons being fixed to a single piston rod 20.

It will be seen that whenever air under pressure is admitted into passage 6 it flows into the left hand end of the main cylinder, under the control of the corresponding needle valve, and also into the right hand end of the right hand auxiliary cylinder. Likewise, when air is admitted into passage 8, pressure is built up in the right hand side of the main cylinder and in the outer end of the left hand auxiliary cylinder in opposition to the pressure in the main cylinder. The pressure in the auxiliary cylinders serves as a buffer to dampen the movements of the main piston.

In the valve casing are valve means to exercise the control which is the purpose of the device and, at the same time cause the main piston unit to reverse its direction of movement at the end of each stroke. The valve casing is divided interiorly into five chambers, 24, 25, 26, 27 and 28 by four transverse partitions, 29, 30, 31 and 32 grouped fairly close together so that the three intermediate chambers are narrow and the end chambers large. A pressure gauge, not shown, may be attached to a pipe 33 fixed to the valve casing so as to communicate with the central chamber 26, as shown in Fig. 2. At least the inner portion of chamber 28 is a cylinder with its axis paralleling the axis of piston rod 20. The partitions have cylindrical bores 34 through the same coaxial with chamber 28, and they are thickened around such bores to give substantial length to the latter. In chamber 28 is a piston 35 fixed on a rod or stem 36 that extends through the entire length of the casing from head 5 out through an opening 37 in head 4. On this stem are two valve elements comprising cylindrical pieces 38 and 39 that are a sliding fit in the bores 34 in the four partitions. The parts are so proportioned that in one extreme position of the movable valve unit, as shown in Fig. 1, the two valve elements fill the bores in the second and fourth partitions, whereas, when pushed to the limit in the other direction, they fill the bores in the first and third partitions. A spring 40, surrounding the stem in chamber 24 and bearing at its ends against head 4 and a collar or flange 41 on the stem, normally holds the valve unit in the position shown; whereas piston 35 and its cylinder 28 serve as an actuator to move the valve unit into and hold it in its other position.

A pipe 42 for supplying air under pressure is connected to chamber 26; chamber 27 is connected to passage 8 by a port 44; chamber 25 is connected to passage 6 by port 45, as shown in Fig. 3; chamber 28 vents to the atmosphere through a port 46 placed close to partition 32, and chamber 24 vents to the atmosphere through a port 47. Therefore, with the parts in the positions shown in Fig. 1, the right hand end of main cylinder 2 is connected to the supply of air under pressure through port 11ª, passage 9ª, passage 8, port 44, chamber 27, bore 34 in partition 31, and chamber 26. The left hand end is connected to the atmosphere, in the same way, past the other needle valve, passage 6, port 34, chamber 25, the bore in partition 29, chamber 24 and port 47. So, also, pipe 49 is being supplied with compressed air and pipe 48 is opened to the atmosphere; these pipes leading to a station or stations where the automatic timing is desired.

It is evident that when the valve unit is pushed to the left, in Fig. 1, until a shoulder 50 on the valve stem strikes head 4, conditions are reversed, the left hand end of the main cylinder and pipe 48 receiving air, while the right hand end of the cylinder and pipe 49 are exhausting to the atmosphere.

From the foregoing it will be apparent that the large piston is moving toward the left in Fig. 1. This movement continues until the main piston strikes the end of the stem 51 of a little valve 52 in head 4. This valve, which is normally held closed by a spring 54, shuts off communication between a chamber 55 and a passage 56 that communicates with one end of passage 7, just as passage 56ª in Fig. 7 communicates with the other end of that passage. Chamber 55 is in open communication with passage 17 that allows air to flow from passage 8 into the left hand end of auxiliary cylinder 12. When the main piston reaches valve stem 51 it pushes the same back and allows air to flow from passage 8 into passage 7 and from there to a valve device similar to the one just described, and having a movable member 52ª, arranged in cylinder head 5. As can be seen in Figs. 5 and 7, passage 56ª, corresponding to passage 56 at the other end of the device, not only communicates with passage 7 but also with the right hand end of chamber 28 in the reversing valve device. Consequently, when valve 52 is opened, air flows into the right hand end of the casing of the reversing valve, as viewed in Fig. 1, through a passage 57, forcing the movable valve unit toward the left against the resistance of the spring 40. Thus, as has heretofore been explained, the connections to the main cylinder and its two auxiliary cylinders are reversed, the left hand end of auxiliary cylinder 12 and the right hand end of the main cylinder being connected to the atmosphere and air under pressure being admitted into the right hand end of auxiliary cylinder 12ª and the left hand end of the main cylinder; the piston unit starting back toward the right and continuing until the main piston strikes the stem of valve 52ª. Chamber 55ª does not connect with passage 17ª as does chamber 55 with the corresponding passage, but it vents to the atmosphere through a port 58. This permits air to exhaust from the right hand end of chamber 28 in the valve casing, so that spring 40 may again shift the valve unit into the position shown in Fig. 1; the main and auxiliary pistons then starting to move toward the left again.

It will be seen that when the main piston starts on a return stroke, after opening valve 52, this valve closes and no more air flows past the same to make good any loss in the air that holds the reversing valve in the left hand position. To guard against any failure of the reversing valve to remain where it is until the main piston has travelled all the way back, I have connected the right hand end of chamber 28 to passage 6 through a port 59, as shown in Fig. 5. Therefore, as long as air is being supplied to push the main piston toward the right, there will be an adequate holding pressure on the reversing valve, without relying on pilot valve as in prior practice.

In the construction as heretofore described, the air must exhaust from the main cylinder through the throttling needle valves. To provide for a free exhaust, I prefer to place in each end of the main cylinder a separate exhaust port 60, as shown in Figs. 2 and 6, that communicates with a passage 61 extending through the valve casing portion of the main casting down into the vicinity of the land or valve seat in the nearest partition, 29 or 32, as the case may be. From each such passage there extends a branch passage 62 that opens out through such valve seat. Thus, in Fig. 1, the left hand end of the main cylinder is exhausting through chamber 25, the bore in partition 29 and vent 37. Since this end of the cylinder is also connected to the passage 62 that opens out through the now exposed valve seat in this same partition, free venting may take place independently of the outlet directly controlled by the corresponding needle valve.

The speed at which the main piston can travel in either direction depends on the adjustment of the needle valves. The time required to complete either stroke may be regulated to vary from a few seconds to several minutes, and the stroke in one direction may require, for example, the maximum length of time while the stroke in the opposite direction is completed in the least possible time.

The auxiliary cylinders are made of glass so that one may see at a glance whether the device is operating. If they become smeared with oil, they can easily be detached and cleaned. Should the piston unit stick, it may be pushed from either end by removing a plug 64 in the head 15 or 15ᵃ, as the case may be.

It is believed that the operation of the timer has been fully described in connection with the description of the structure. It may possibly be made plainer by a brief reference to the diagram, Fig. 9, wherein the parts are numbered to correspond with the numbering in Figs. 1 to 8; the needle valves and the extra exhausts for the main cylinder being omitted. In the diagram, air is flowing from supply pipe (inlet 42) through chambers 26 and 27 and port 44 to passage 8 and from there into the right hand end of the main cylinder. The left hand end of that cylinder is exhausting through passage 6, port 45, bore 34 in partition 29, and vent 47. The left hand end of cylinder 12 is receiving air from passage 8 through 17 and 16. The right hand end of cylinder 12ᵃ is vented through passage 6 as is the right hand end of the valve casing where port 59 connects it with passage 6. During this time air is being carried to a control station through port 49 while port 48 connects the station to the atmosphere. When valve 52 opens at the end of the stroke now in progress, air flows into passage 7 and from there through passage 57 into the right hand end of the valve casing, shifting the valve to the left. When this occurs, passage 8 is connected to vent 46 and passage 6 to the source of supply of compressed air 42, causing the main piston to travel toward the right. Since air enters passage 6 immediately after valve 52 is opened and the reversing valve shifted, air under pressure to hold the latter valve in its new position flows from passage 6 through passage or port 59 into the right hand end of the reversing valve casing before the main piston starts back and allows valve 52 to close again. When the main piston reaches its extreme right hand position, it opens valve 52ᵃ which causes the air in the right hand end of the reversing valve casing to exhaust through port 58, thereby permitting spring 40 to return the reversing valve to the position which it occupies in the diagram, so that the main piston unit again starts back toward the left. No change occurs while the piston unit is travelling to the position shown in the diagram, except that valve 52ᵃ closes; whereby the right hand end of the reversing valve casing is shut off from communication with the atmosphere and is again ready to receive and retain air under pressure to shift the reversing valve and hold it upon completion of the current stroke of the main piston unit.

Each of pipes 48 and 49 may be said to correspond to an end of the main cylinder so as to be supplied with air or vented in unison with its respective cylinder end. While the uses to which such control of air in the two pipes are many, one such use is for operating the control valves for the blowing medium in socalled "puffing" soot blowers which are required to discharge steam or air for two or three seconds at a time, at predetermined intervals that usually are measured in minutes. My improved device may thus serve to admit air to and release it from an actuator for a valve or other device or as a master controller for a plurality of such actuators.

While I have illustrated and described with particularity only a single preferred form of my invention, I do not desire to be limited to the precise details thus illustrated and described; but intend to cover all forms and arrangements that come within the definitions of my invention constituting the appended claims.

I claim:

1. A pneumatic timing device comprising a main cylinder having a port at each end, auxiliary cylinders projecting from the ends of the main cylinder, a main piston reciprocable in said main cylinder, auxiliary pistons fixed to the main piston and reciprocable in the auxiliary cylinders, a source of supply of compressed air, a two-position reversing valve for admitting air from said source into the main cylinder through either of said ports and the outer end of the auxiliary cylinder at the opposite end of the main cylinder and simultaneously connecting the other port and the outer end of the other auxiliary cylinder to the atmosphere, a spring tending constantly to hold the valve in one of its positions, a pneumatic actuator for moving the valve into its other position, means operated by the piston at one end of its stroke to cause air to be admitted to the actuator, and means operated by the piston at the other end of its stroke to cause air to be exhausted from the actuator.

2. A device as set forth in claim 1, wherein the cylindrical portions of the auxiliary cylinders are transparent tubes.

3. In a pneumatic timing device, a main cylinder, auxiliary cylinders of smaller diameter at opposite ends of and in axial alignment with the same, pistons in said cylinders rigidly connected together, the outer end of each auxiliary cylinder being connected to the remote end of the main cylinder by a separate passage and means to admit air under pressure alternately into said passages and, simultaneously with the admission of air into one passage, connecting the other passage to the atmosphere.

4. A timing device as set forth in claim 3, wherein there are needle valves cooperating with the passages at such points that they control the flow of air to the main cylinder only.

5. In a device of the character described, a member having a cylindrical bore extending through the same from one end to the other and forming the main cylinder, cylinder heads closing the ends of said main cylinder, each head having an opening at the axis of aforesaid cylinder, glass tubes arranged outwardly from said heads in registration with said openings and in axial alignment with the main cylinder, heads closing the outer ends of the tubes, elements detachably mounted on said member supporting the latter heads, and pistons in said main cylinder and in said sleeves secured together to form a single unit.

6. In a device of the character described, a casting containing a main cylinder bore and a valve chamber extending throughout the length thereof and opening out through its end faces, heads at opposite ends of the casting, each serving to close an end of the cylinder and an end of the valve chamber, auxiliary cylinders of smaller diameter secured to said heads in axial alignment with the main cylinder, connected pistons in said cylinders, said casting containing air passages extending through the same from end to end, heads closing the outer ends of said auxiliary cylinders, and pipes connected to the first mentioned heads and communicating through the latter with two of said passages, each of said pipes supporting one of the auxiliary cylinder heads and communicating through the latter with the corresponding auxiliary cylinder.

7. In a device of the character described, a casting having a large cylindrical bore comprising the main cylinder of the device and a chamber separated therefrom both extending throughout the length thereof and open at their ends, the casting containing, also, a plurality of open-ended passages extending throughout the length thereof between said bore and said chamber, a detachable head for each end of the casting, auxiliary cylinders carried by said heads in axial alignment and in communication with the main cylinder, self-closing valves in each head cooperating with said passages and so located that the piston in the large bore opens them alternately at the ends of its strokes, a reversing valve in said chamber, connected pistons in said cylinders, and means for admitting air under pressure into the reversing valve.

SIDNEY E. MEYERS.

REFERENCES CITED

The following references are of record in the file of this patent:

UNITED STATES PATENTS

| Number | Name | Date |
|---|---|---|
| 162,557 | Hudson | Apr. 27, 1875 |
| 986,592 | Rankin | Mar. 14, 1911 |
| 1,443,200 | Adams | Jan. 23, 1923 |
| 1,756,307 | Rowntree | Apr. 29, 1930 |
| 1,877,102 | Whitesell | Sept. 13, 1932 |
| 2,072,403 | Lausen | Mar. 2, 1937 |

FOREIGN PATENTS

| Number | Country | Date |
|---|---|---|
| 11,884 | Sweden | Jan. 12, 1901 |